United States Patent [19]
Webster

[11] 4,374,352
[45] Feb. 15, 1983

[54] AC INDUCTION MOTOR BRAKING SYSTEM
[75] Inventor: Douglas G. Webster, Saratoga, Calif.
[73] Assignee: Veeco/Macronetics Inc., Sunnyvale, Calif.
[21] Appl. No.: 285,588
[22] Filed: Jul. 21, 1981
[51] Int. Cl.³ .............................................. H02P 3/24
[52] U.S. Cl. ..................................... 318/762; 318/375
[58] Field of Search ......................... 318/760, 762, 375

[56] References Cited
U.S. PATENT DOCUMENTS
3,341,758  9/1967  Plumpe, Jr. .......................... 318/762
3,475,669 10/1969  Oltendorf ............................. 318/762
3,872,363  3/1975  Gross .................................. 318/762

Primary Examiner—David Smith, Jr.
Attorney, Agent, or Firm—Morgan, Finnegan, Pine, Foley & Lee

[57] ABSTRACT

A three-terminal network which electrically senses the time at which the voltage applied to an AC induction motor is removed and concurrently therewith utilizes energy which was previously stored in a capacitor to effect eddy-current braking of the AC induction motor is disclosed.

The disclosed system may be utilized to quickly, i.e., within two revolutions, brake a two-terminal shaded-pole induction motor, or a two-terminal unidirectional split-phase motor, or a three-terminal bidirectional split-phase motor.

3 Claims, 5 Drawing Figures

AC INDUCTION MOTOR BRAKING SYSTEM

BACKGROUND OF THE INVENTION

This invention relates to the field of industrial process control, and, more particularly, to a system for braking an AC induction motor utilized as part of an industrial process control system.

Unlike synchronous-inductor motors wherein the rotor quickly stops when the motor is de-energized, due to the natural "cogging" or "detenting" action between the rotor and stator, AC (squirrel cage) induction motors have no natural "cogging" or "detenting" action. Thus, when an AC induction motor is de-energized, it has a tendency to coast. In routine applications this coasting action (over-travel) is not a problem, but in precision applications it can be quite undesirable.

For example, in the semiconductor wafer processing equipment marketed by the assignee of the present invention, an AC induction motor is used to drive (through a gear train) the lead screw of a direct drive elevator which vertically positions a cassette used for transporting and storing the semiconductor wafers. During operation of the elevator, a photo-electric sensing mechanism is used to detect the proper position of the elevator lead-screw at which point the motor is de-energized. Any over-travel of the motor will cause the cassette to be positioned slightly high or slightly low, depending on the direction of travel. This positioning error can prevent proper transport of the wafers due to mechanical interference with the "lands" of the cassette which separate and support the wafers. Accordingly, it is quite undesirable.

An optimal braking system for AC induction motors typically utilized in the field of industrial process control would possess certain important attributes. In particular, it should be capable of quickly causing the motor to come to a complete stop in a minimum number of revolutions. Moreover, it should be relatively inexpensive to implement and should be versatile, i.e., capable of being used with various types of AC induction motors. And finally, it should be reliable, simple and easy to attach.

Prior to the present invention it is believed that the above needs have gone unfulfilled.

It is accordingly a general object of the present invention to overcome the aforementioned limitations associated with AC induction motors and to fulfill the needs mentioned by providing a braking system for an AC induction motor having characteristics more nearly approaching the optimal attributes noted above.

It is specific object of the present invention to provide a safe, relatively inexpensive braking system for causing an AC induction motor to quickly come to a complete stop within several revolutions.

Other objects will be apparent in the following detailed description and practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as an electronic braking system for an AC induction motor comprising: means operatively connected to said motor for storing electrical energy derived from the AC voltage applied to said motor; controllable switching means connected in series between said energy storing means and said motor and being operable between a non-conducting state and a conducting state; means operatively connected to said motor for sensing when the applied AC voltage is removed from said motor; and switching control means responsive to said sensing means, said control means causing said switching means to switch from the non-conducting state to the conducting state when the applied AC voltage is removed from said motor, and thereby providing a circuit path between said energy storing means and said motor allowing the stored electrical energy to be transferred to said motor and effecting braking thereof.

BRIEF DESCRIPTION OF THE DRAWINGS

Serving to illustrate an exemplary embodiment of the invention are the drawings of which.

DESCRIPTION OF THE PREFERRED EMBODIMENT

The AC induction motor braking system of the present invention comprises a three-terminal network which electrically senses the time at which the applied AC voltage is removed from the motor and then utilizes energy which was previously stored in a capacitor to cause a large single (exponentially decaying) pulse of DC current to flow through the windings of the AC induction motor, thereby causing the motor to quickly brake, i.e., come to a complete stop.

As described in more detail below, the AC induction motor braking system of the present invention may be utilized to brake a two-terminal shaded-pole induction motor, as illustrated in FIG. 1(a); or a two-terminal unidirectional split-phase motor, as illustrated in FIG. 1(b); or a three-terminal bidirectional split-phase motor, as illustrated in FIG. 1(c).

Figure 1:
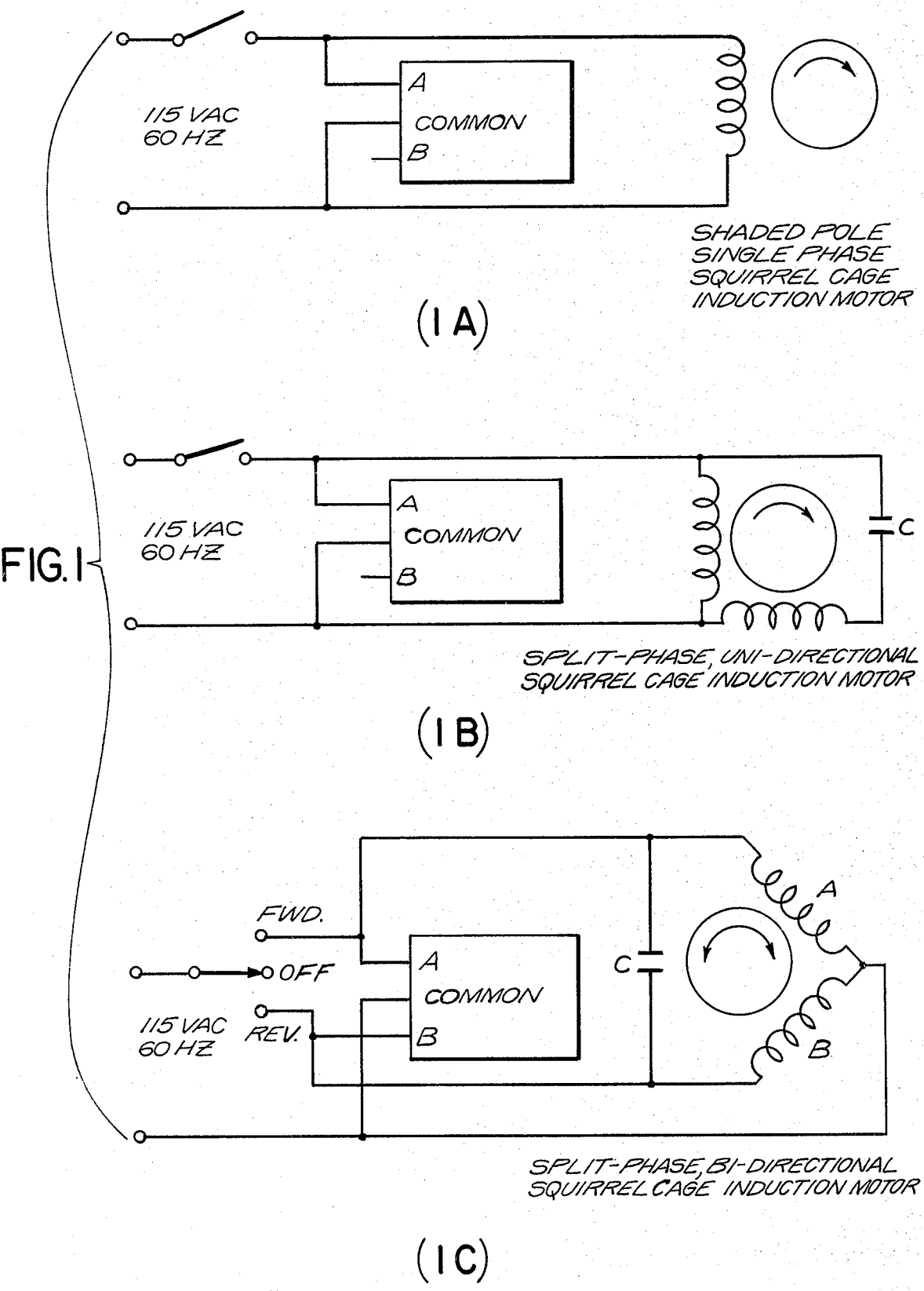
FIGS. 1(a), (b), (c) illustrate how the AC induction motor braking system of the present invention is connected to a two-terminal single phase shaded-pole AC induction motor, a split-phase, unidirectional AC induction motor, and a split-phase, bidirectional AC induction motor, respectively.
Figure 2:
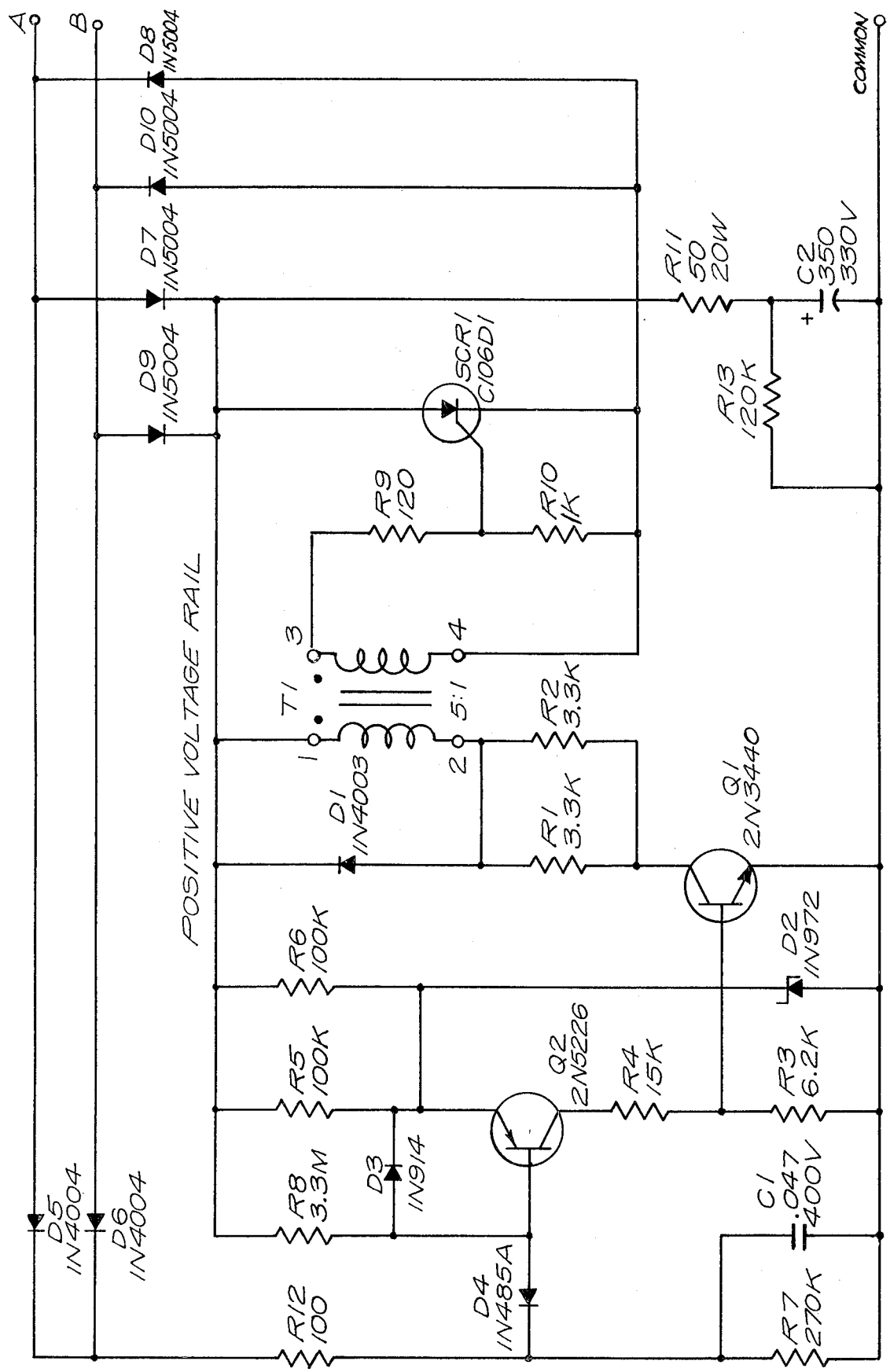
FIG. 2 is a detailed schematic diagram of the AC induction motor braking system of the present invention.
Figure 3:
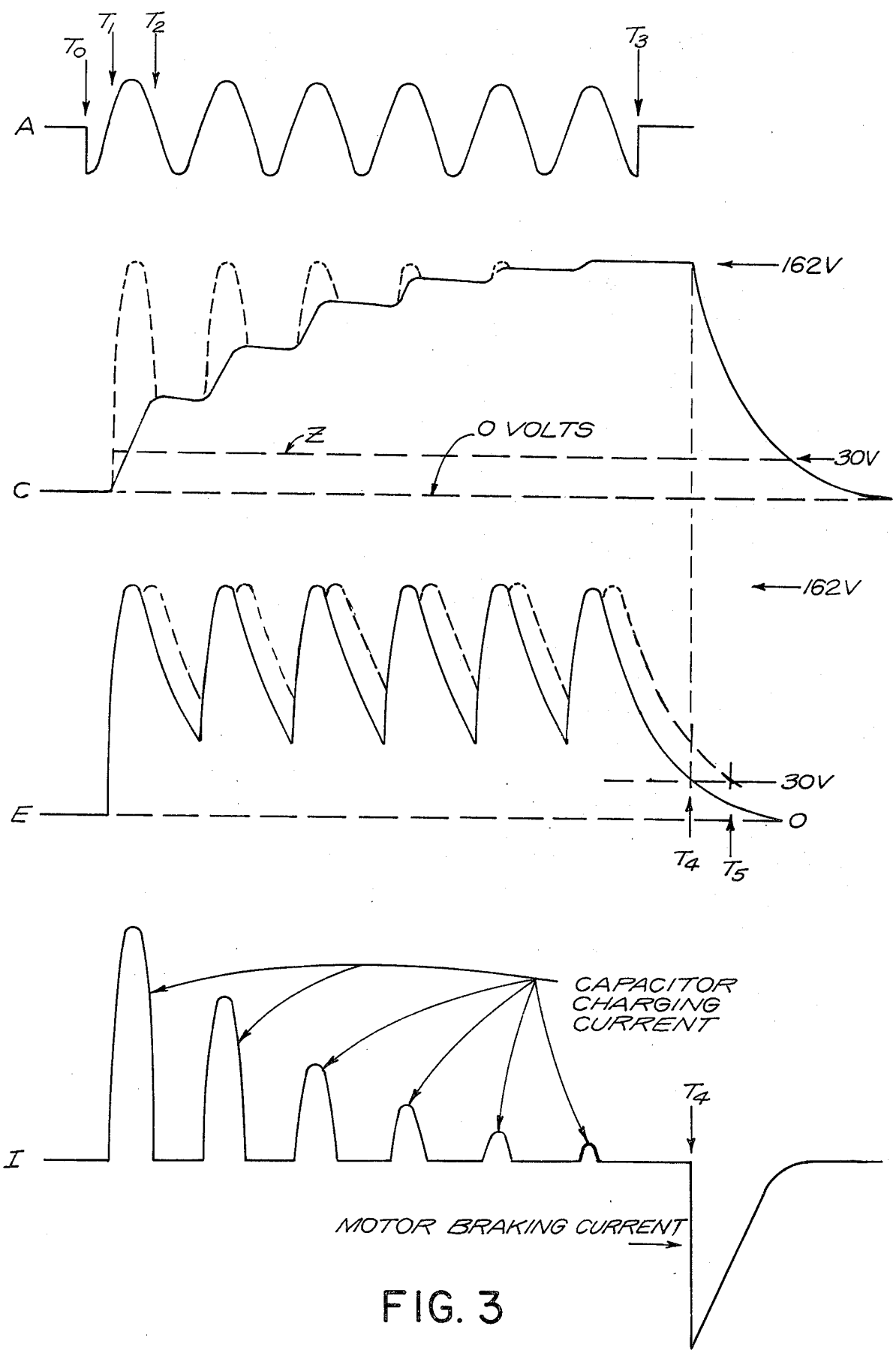
FIG. 3 illustrates typical waveforms at various points on the schematic illustrated in FIG. 2.

Referring now to FIGS. 1, 2 and 3, the two-terminal configuration illustrated in FIG. 1(a) will be described first. When the AC voltage is initially applied to the motor illustrated in FIG. 1(a), it is simultaneously applied to terminals A and COMMON of the braking system and the motor begins to turn. As shown in FIG. 2, capacitor C2 charges through resistor R11 and diode rectifier D7 on each positive half cycle of the applied AC voltage. The applied voltage at terminal A is depicted in FIG. 3 as waveform A. As illustrated therein, the applied voltage starts (at time T0) at the peak of the negative half cycle. On the following positive half cycle (during the time interval from T1 to T2), rectifier D7 is forward biased and capacitor C2 is partially charged as illustrated in waveform C of FIG. 2. As shown therein, the charge on capacitor C2 builds up with each successive positive half cycle until it is fully charged. (For the sake of illustration, capacitor C2 is shown to reach approximately 90 percent of full charge in six positive half cycles, but in practice, it actually takes nine or ten half cycles.) The charging rate of capacitor C2 is controlled by the R11×C2 time constant.

The voltage at the cathode of diode D7 serves as a positive voltage rail to the circuitry shown to the left thereof and is depicted by the dotted line of waveform D in FIG. 3. It is noted that during the conduction time of diode D7, the voltage rail follows the applied AC voltage, but when the applied AC voltage drops below the voltage on capacitor C2 diode D7 is reverse biased and waveform D is the same as waveform C. The difference between the D and C waveforms represents the voltage applied across resistor R11 which causes capacitor C2 to charge.

When the D waveform (positive rail) reaches +30 volts, zener diode D2 begins to conduct and clamp, thereby providing a +30 volt reference voltage for the emitter of transistor Q2. As the D waveform voltage continues to increase in a positive sense, resistors R5 and R6 supply more bias current to zener diode D2, however, the reference voltage at the emitter of transistor Q2 is maintained at +30 volts, as illustrated by the Z waveform in FIG. 3. Resistors R5 and R6 in parallel act as a single 50K ohm resistor. A 50K ohm, however, in the same position would dissipate approximately ⅓ watt. A single 50K ohm resistor, ½ watt would be acceptable, but for procurement reasons two 100K ohm resistors, ¼ watt may be more desirable. In this manner, R5 and R6 each dissipate 1/6 watt each and operate safely within design limits.

As noted above, the time at which the AC voltage is removed is electrically sensed and almost concurrently therewith a large pulse of DC current is caused to flow through the windings of the motor, thereby causing the motor to quickly come to a complete stop. This sensing function is implemented with a second timing circuit consisting of diode rectifier D5, resistor R12, resistor R7 and capacitor C1 in conjunction with switching transistors Q1 and Q2. During the first positive half cycle of applied AC voltage, capacitor C1 is quickly charged through diode D5 and resistor R12. Because of the small RC time constant, the voltage across capacitor C1 follows (almost immediately) the applied AC voltage. This is illustrated by waveform E of FIG. 3. Resistor R7 is chosen such that when diode D5 is reverse biased the discharge time constant is approximately one full cycle time (approximately 13.5 milliseconds). This causes the voltage across capacitor C1, to decay to about +50 volts before it again begins to charge on the next positive half cycle of applied AC voltage. It is noted that during the time the AC voltage is applied, the voltage across capacitor C1 is always more positive than the voltage across the zener diode D2. Resistor R8 provides forward bias current to diode D3 which ensures a slight (one diode drop) off bias to the base-emitter junction of transistor Q2. Since the voltage across capacitor C1 is more positive than the voltage across the zener diode D2, diode D4 is reverse biased and transistor Q2 remains off.

Because of the start (13.5 millisecond) discharge time constant noted above, when the applied AC voltage is removed (at time T3), the voltage across capacitor C1 quickly decays to +30 volts (at time T4). At this point, diode D4 is forward biased and begins to conduct. Resistor R7 now provides base current through diode D4 to turn on transistor Q2. The emitter of transistor Q2 remains at +30 volts and supplies base current through resistor R4 to turn on transistor A1. Resistor R3 is placed between the base and emitter of transistor Q1 to provide a current path to the COMMON terminal (emitter of transistor Q1) for any "leakage current" into the base of transistor Q1, and thus ensures that Q1 remains in the off state until transistor Q2 turns on.

Prior to the time the applied AC voltage is removed, capacitor C2 is fully charged to approximately +162 (115×√2) volts which maintains the voltage rail through R11 at approximately +162 volts. Thus, when transistor Q1 turns on, +162 volts are applied to the primary of pulse transformer T1 in series with the two parallel resistors, R1 and R2. Resistors R1 and R2 in parallel act as a single 1.65K ohm resistor. A single 1.65K ohm resistor in the same position would instantaneously dissipate 15 watts but due to the short time that transistor Q1 applies voltage to transformer T1 through the 1.65K ohm series resistor, a single 1.65K ohm, ½ watt resistor can safely be used. For procurement reasons, however, two 3.3K resistors, ¼ watt may be more desirable. In this manner, R1 and R2, instantaneously dissipate 7.5 watts each, but because of the short time that voltage is applied, the average safe operating limits for resistor R1 and R2 are not exceeded. If (for any reason) transistor Q1 should turn off before capacitor C2 is completely discharged (this should never normally happen) the energy stored in the primary winding of transformer T1 (given by ½ LI²) causes the voltage at the primary terminals of transformer T1 to reverse polarity. Under these conditions, diode rectifier D1 provides a current path through which this energy can be dissipated into the diode D1. This diode is commonly called a "free-wheeling" diode. Without the protection diode, D1, the induced voltage (inductive kick) could cause the collector voltage of transistor Q1 to exceed the rated voltage and damage to transistor Q1 could occur. Because of the 5:1 turns ratio of pulse transformer T1, it would be expected that a +32 volt pulse would be applied to the gate of silicon controlled rectifier SCR1 via resistor R9. However, because of the mutual inductance of the pulse transformer T1 and the voltage drop across resistors R1 and R2 the voltage pulse used to control the switching of SCR1 is less than +32 volts, but is sufficient to deliver the required gate current through resistor R9 to "trigger" the SCR1 into the conducting state. Resistor R10 is placed between the gate and cathode terminals of SCR1 and provides a current path to the cathode for any "leakage current" into the gate of SCR1 to ensure that SCR1 remains in the off-state until the intended trigger pulse is applied by the secondary winding of transformer T1 through resistor R9.

The instant SCR1 is triggered into conduction, the stored energy in capacitor C2 causes current to flow through the path provided by R11, SCR1 and D8, (through terminal A) into the winding of the motor from which the AC voltage has just been removed. Waveform I of FIG. 3 shows the positive current pulses where current (or charge) flows into capacitor C2, and also the large negative current pulse (at time T4) when SCR1 is triggered on and current (or charge) flows out of capacitor C2 causing DC current to flow through resistor R11 and into the motor winding. When the negative current pulse decays to approximately 1 milliampere, SCR1 automatically turns off.

Just prior to removal of the applied AC voltage, AC current was flowing in the winding of the motor and was limited by the AC impedance of the winding. in FIG. 1(a), the shaded pole motor is caused to turn by virtue of the shaded poles (partial-pole shorting straps)

which cause a time-phase displacement of the flux vector impressed to the squirrel cage rotor by the stator winding. The result is a flux vector which rotates through 360 mechanical degrees for every cycle of applied AC voltage. When the flux vector rotates, a voltage is induced in the squirrel cage lattice conductors of the rotor. Due to the low impedance of the squirrel cage lattice (bars), short circuit currents are caused to flow which react with the flux vector to generate a torque and the rotor begins to turn. If there were no frictional or windage losses, the rotor of the motor would turn at exactly 3600 rpm (or 60 revolutions per second) in exact synchronization with the applied AC voltage. In practice, however, the motor turns at about 3500 rpm, and when the applied AC voltage is removed, the motor will coast and continue to turn at about 3500 rpm.

However, in accordance with the present invention, when SCR1 is triggered a large pulse of DC current is passed through the motor windings. This pulse of current peaks at 5 to 10 times the peak motor current under normal AC operation (but is not harmful to the motor). The flux vector which results from this large DC current pulse is stationary (or fixed) and does not rotate. The rotor at this instant, however, is still turning at about 3500 rpm. The copper bars of the squirrel cage rotor lattice can be considered to cut the lines of this large DC flux vector, and as the bars pass through the flux field (magnetic field) voltages are induced, which due to the low impedance of the lattice network, cause large currents to flow in the copper bars. These currents react with the flux field to create a large braking torque, to actually stop the motor. This phenomena is known as eddy-current braking. So effective is the braking that the motor comes to a complete stop in less than two revolutions.

It is well known that when a capacitor is charged the stored energy in the capacitor is given by $E = \frac{1}{2} CV^2$ where E is the energy in watt-sec., C is the capacitance in farads, and V is the voltage in volts. Each time capacitor C2 is charged, an equal amount of energy is dissipated in the series charging resistor R11. Thus, for this reason, resistor R11 must be of sufficient wattage to dissipate the energy.

Each time SCR1 is triggered the stored energy is transferred through resistor R11 to the motor winding. Typically, the motor winding resistance is about 20 ohms. Accordingly, resistor R11 conveniently should be chosen to limit the peak charging current to a practical value. Choosing R11 as 50 ohms yields a value of peak charging current of approximately 3.25 amperes. When capacitor C2 is discharged through this value of resistor R11 in series with the motor winding resistance, the peak braking current is limited to approximately 2.32 amperes. The value of capacitor C2 is chosen to provide sufficient stored energy to bring the motor to a complete stop. Preferably, the RC time constant of R11 and C2 should be selected such that C2 reaches 90 percent of full charge in 9 or 10 cycles of applied AC voltage (or approximately 170 milliseconds). If the value of resistor R11 were made larger, not only would the charging time be increased, but the braking time would be increased and the stopping time would exceed 2 revolutions. The only practical limit on how small resistor R11 can be is the current handling limits of the components involved, and any possible damage to the motor due to peak braking current. It is noted that the value of resistor R11 does not enter into the energy equation above, i.e., the stored energy is not affected by the value of R11. Resistor R11 only affects how long it takes to fully charge capacitor C2. To prevent injury to test personnel C2 may be shunted with a large resistor, R13, to bleed off any residual charge.

It is noted that when the SCR1 is triggered the stored energy ($\frac{1}{2} CV^2$) is dissipated proportionately between the series resistor R11 and the motor winding resistance. With the values indicated of 50 ohms and 20 ohms respectively, the energy splits on a 50/20 basis each time the SCR1 triggers. This additional dissipation (heat) in resistor R11 is considered in the selection of the wattage rating for resistor R11. The heat which is dissipated in the motor windings is not harmful to the motor.

The above description was directed to the two-terminal configuration illustrated in FIG. 1(a). Although the two-terminal configuration of FIG. 1(b) employs a different type of motor, the operation of the braking system is identical to the description above. It is noted that in the split-phase motor configurations illustrated in FIGS. 1(b) and 1(c), the rotational flux vector in the stator which in turn causes the rotor to turn, is achieved by the "phase-splitting" action of the capacitor which causes the current in the "capacitor-split" winding to "lead" the current in the "direct" winding by approximately 90 electrical degrees. This does not affect the operation of the braking circuit.

The operation of the three-terminal configuration application illustrated in FIG. 1(c) differs from the description above in the following aspects. If the motor illustrated in FIG. 1(c) is operated in the forward direction the AC voltage is applied between the A and COMMON terminals of the braking circuit and the operation would be identical to the description above. It is noted, however, that the capacitor C and winding B form a phase splitting network and (ideally) the voltage at terminal B will be approximately equal in magnitude and 90 degrees phase shifted from terminal A. However, because of the impedance of the capacitor C and winding B, the voltage of terminal B is "softer" (higher impedance driven) than at terminal A, and therefore, does not dramatically affect the charging curve (waveform C of FIG. 3) for capacitor C2 in the braking system. However, because of the small value of capacitor C1, the charging curve for C1 (waveform E of FIG. 3) is modified as shown by the dotted lines in FIG. 3. This may have the effect of slightly delaying the trigger point of SCR1 (from time T4 to T5).

When the motor illustrated in FIG. 1(c) is operated in the reverse direction the operation of the braking system is identical, however, the roles of terminals A and B are reversed, since the AC voltage is applied now between terminals B and COMMON.

The reasons for adding to the braking system the B terminal and the associated diode rectifiers D9, D6 and D10, is to provide symmetry. If terminal B were eliminated, capacitor C2 would be charged "directly" from the A terminal during forward operation, but during reverse operation would be charged "indirectly" or "softly" through the phase splitting action of winding A and capacitor C. Because of the variations in the winding impedance and value of phase-splitting capacitor C, this asymmetry could be troublesome. Thus, by adding the B terminal and the three extra diode rectifiers (D9, D6 and D10) symmetrical operation is achieved.

Exemplary values for the various components embodied in the braking system illustrated in FIG. 2 are as follows. Unless otherwise specified, resistor wattages are ¼ watt and tolerances are 5%.

R1—3.3K ohms
R2—3.3K ohms;
R3—6.2K ohms;
R4—15K ohms;
R5—100K ohms;
R6—100K ohms;
R7—270K ohms;
R8—3.3M ohms;
R9—120 ohms;
R10—1.0K ohms;
R11—50 ohms;
R12—100 ohms;
R13—120K ohms;
C1—0.047 microfarads (400V);
C2—350 microfarads (330V);
D1—1N4003;
D2—1N972;
D3—1N914;
D4—1N485A;
D5—1N4004;
D6—1N4004;
D7—1N5004;
D8—1N5004;
D9—1N5004;
D10—1N5004;
T1—Bourns P/N PL-9020;
SCR1—C106D1 (General Electric); Q1—2N3440; Q2—2N5226.

It is clear that the above description of the preferred embodiment in no way limits the scope of the present invention which is defined by the following claims.

What is claimed is:

1. An electronic braking system for an AC induction motor comprising:
   (a) first means connected across the windings of said motor, said first means including a first diode connected in series with a first capacitor, said first capacitor storing energy derived from the AC voltage applied to the windings of said motor;
   (b) second means connected across the windings of said motor, said second means including a second resistor connected in parallel with a second capacitor, said second capacitor sensing when the applied AC voltage is removed from the windings of said motor;
   (c) third means connected across said first diode, said third means including controllable unidirectional electronic switching means operable between a non-conducting state and a conductive state and oriented to permit current to flow in a direction opposite to the direction of current flow in said first diode; and
   (d) fourth means operatively connected to said second capacitor for selectively controlling the switching of said controllable unidirectional electronic switching means from the non-conducting state to the conducting state, said fourth means including transistor switching means operable between an off state and an on state and pulse transformer means, said transistor switching means operatively connected and responsive to the voltage across said second capacitor and switching from the off state to the on state in response to the removal of the AC voltage applied to the windings of said motor, said pulse transformer means operatively connected to said first capacitor, to said transistor switching means, and to said controllable unidirectional electronic switching means, said pulse transformer means providing in response to the switching of said transistor switching means from the off state to the on state a control signal to said controllable unidirectional electronic switching means causing said controllable unidirectional electronic switching means to switch from the non-conducting state to the conducting state, said controllable unidirectional electronic switching means in the conducting state providing a path for the energy stored in said first capacitor to be transferred to the windings of said motor and to effect eddy-current braking of said motor.

2. In combination with an AC induction motor, an electronic motor braking system comprising:
   (a) charging network means connected across the windings of said motor, said charging network means comprising a series circuit including a first diode, a first resistor, and a first capacitor, said first capacitor storing energy derived from the AC voltage applied to the windings of said motor;
   (b) voltage sensing network means connected across the windings of said motor, said voltage sensing network means comprising a series circuit including a second resistor, and a second capacitor in parallel with a third resistor, said second capacitor electrically sensing when the applied AC voltage is removed from the windings of said motor;
   (c) discharging network means connected across said first diode, said discharging network means including controlled rectifier switching means operable between a non-conducting state and a conducting state and oriented to permit current to flow in a direction opposite to the direction of current flow in said first diode, said discharging network means further including means for preventing said controlled rectifier switching means from switching in the absence of an appropriate control signal from the non-conducting state to the conducting state; and
   (d) switching control network means operatively connected to said second capacitor for selectively controlling the switching of said controlled rectifier switching means from the non-conducting state to the conducting state, said switching control network means including a transistor switching network operable between an off state and an on state and a pulse transformer network, said transistor switching network operatively connected and responsive to the voltage across said second capacitor and switching from the off state to the on state in response to the removal of the AC voltage applied to the windings of said motor, said pulse transformer network including a pulse transformer having a first and second input terminal and an output terminal, said first input terminal operatively connected to said first capacitor, said second input terminal operatively connected and responsive to said transistor switching network, said output terminal operatively connected to said controlled rectifier switching means, said pulse transformer network providing in response to the switching of the transistor switching network from the off state to the on state a control signal to said controlled rectifier switching means causing said controlled rectifier switching means to switch from the non-conducting state to the conducting state, said controlled rectifier switching means in the conducting state providing a discharge path for the energy stored in said first capacitor to be transferred to the windings of said motor and to effect eddy-current braking of said motor.

3. In an industrial process control system including an AC induction motor for controlling one or more of the parameters of the industrial process, the improvement comprising:

(a) a charging network connected across the windings of said motor, said charging network comprising a series circuit including a first diode, a first resistor, and a first capacitor in parallel with a second resistor, said first capacitor storing energy derived from the AC voltage applied to the windings of said motor;

(b) a voltage sensing network connected across the windings of said motor, said voltage sensing network comprising a series circuit including a second diode, a third resistor, and a second capacitor in parallel with a fourth resistor, said second capacitor electrically sensing when the applied AC voltage is removed from the windings of said motor;

(c) a discharging network connected across said first diode, said discharging network comprising a series circuit including a silicon controlled rectifier operable between a non-conducting state and a conducting state and a third diode, said silicon controlled rectifier and said third diode oriented to permit current to flow in a direction opposite to the direction of current flow in said first diode, said discharging network further including means for preventing said silicon controlled rectifier from switching in the absence of an appropriate control signal from the non-conducting state to the conducting state; and (d) a switching control network operatively connected to said second capacitor for selectively controlling the switching of said silicon controlled rectifier from the non-conducting state to the conducting state, said switching control network including a transistor switching network and a pulse transformer network, said transistor switching network including a first switching circuit and a second switching circuit, said first switching circuit including a first transistor operable between an off state and an on state, said first transistor operatively connected and responsive to the voltage developed across said second capacitor and switching from the off state to the on state in response to the removal of the AC voltage applied to the windings of said motor, said second switching circuit including a second transistor operable between an off state and an on state, said second transistor operatively connected and responsive to said first switching circuit and switching from the off state to the on state in response to the first transistor switching from the off state to the on state, said second switching circuit including means for preventing said second transistor from switching from the off state to the on state before said first transistor switches from the off state to the on state, said pulse transformer network including a step-down transformer having a first and second input terminal and an output terminal, said first input terminal operatively connected to said first capacitor, said second input terminal operatively connected and responsive to said second switching circuit, said output terminal operatively connected to said silicon controlled rectifier, said pulse transformer network providing in response to the switching of said second transistor from the off state to the on state a control signal to said silicon controlled rectifier causing said silicon controlled rectifier to switch from the non-conducting state to the conducting state, said silicon controlled rectifier in the conducting state and said third diode providing a discharge path for the energy stored in said first capacitor to be transferred to the windings of said motor and to effect eddy-current braking of said motor.

* * * * *